US011319886B1

(12) United States Patent
Dudar

(10) Patent No.: US 11,319,886 B1
(45) Date of Patent: May 3, 2022

(54) SYSTEM AND METHOD FOR PURGING A CANISTER PURGE VALVE FILTER

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/075,579

(22) Filed: Oct. 20, 2020

(51) Int. Cl.
*F02D 41/00* (2006.01)
*F02M 25/08* (2006.01)
*B01D 53/04* (2006.01)
*B01D 46/00* (2022.01)
*B01D 46/71* (2022.01)

(52) U.S. Cl.
CPC ..... *F02D 41/0077* (2013.01); *B01D 46/0036* (2013.01); *B01D 46/71* (2022.01); *B01D 53/0415* (2013.01); *B01D 53/0446* (2013.01); *F02M 25/0836* (2013.01); *F02M 25/0872* (2013.01); *B01D 2259/40086* (2013.01); *B01D 2259/4516* (2013.01)

(58) Field of Classification Search
CPC ............ F02D 41/0077; F02M 25/0836; F02M 25/0872; B01D 46/0068; B01D 46/0036; B01D 53/0415; B01D 53/0446; B01D 2259/440086; B01D 2259/4516
USPC ........................................................ 123/519
See application file for complete search history.

(56) References Cited

U.S. PATENT DOCUMENTS

| 5,970,958 | A | * | 10/1999 | DeLand | F02M 25/0836 |
| | | | | | 123/520 |
| 9,243,592 | B2 | | 1/2016 | Dudar et al. | |
| 2005/0229689 | A1 | * | 10/2005 | Miyahara | F02M 25/08 |
| | | | | | 73/114.41 |
| 2007/0199372 | A1 | * | 8/2007 | Annoura | F02M 25/089 |
| | | | | | 73/114.39 |
| 2009/0084362 | A1 | * | 4/2009 | Chan | B01J 20/20 |
| | | | | | 123/519 |
| 2009/0107472 | A1 | * | 4/2009 | Makino | F02M 25/089 |
| | | | | | 123/520 |
| 2009/0139495 | A1 | * | 6/2009 | Crawford | F02M 25/0854 |
| | | | | | 123/519 |
| 2011/0214759 | A1 | * | 9/2011 | Grillmeier | F02M 25/0872 |
| | | | | | 137/511 |

(Continued)

FOREIGN PATENT DOCUMENTS

JP        11173220 A  *  6/1999  ............. F02M 25/08

OTHER PUBLICATIONS

Bomey, N., "Ford recalls 1.5 million Ford Focus cars that could stall with fuel tank problem," USA Today Website, Available Online at https://www.usatoday.com/story/money/cars/2018/10/25/ford-focus-recall-1-5-m-cars-fixed-avoid-potential-stalling/1759870002/, Oct. 25, 2018, 1 page.

*Primary Examiner* — Mahmoud Gimie
(74) *Attorney, Agent, or Firm* — Geoffrey Brumbaugh; McCoy Russell LLP

(57) ABSTRACT

Systems and methods for regenerating a canister purge valve filter that is included in an evaporative emissions system are disclosed. In one example, pressurized air is applied to a canister purge valve filter to dislodge contaminants from the filter. The contaminants may be discharged from the evaporative emissions system via a check valve that opens in response to the pressurized air.

20 Claims, 7 Drawing Sheets

(56) References Cited

U.S. PATENT DOCUMENTS

| | | | |
|---|---|---|---|
| 2015/0211952 A1* | 7/2015 | Yang | F02M 25/0809 |
| | | | 73/40.5 R |
| 2015/0337775 A1* | 11/2015 | Dudar | F02M 25/08 |
| | | | 123/520 |
| 2016/0356247 A1 | 12/2016 | Dudar | |
| 2016/0376019 A1* | 12/2016 | Jensen | B01D 53/04 |
| | | | 95/141 |
| 2018/0372028 A1* | 12/2018 | Nakata | F02M 25/08 |
| 2020/0318579 A1* | 10/2020 | Honda | F02M 25/089 |
| 2020/0370497 A1* | 11/2020 | Dudar | B60K 15/03504 |

* cited by examiner

SYSTEM AND METHOD FOR PURGING A CANISTER PURGE VALVE FILTER

FIELD

The present description relates to methods and systems for clearing contaminants from a canister purge valve filter. The methods may expel contaminants that are trapped in the canister purge valve filter to outside of a fuel vapor storage system.

BACKGROUND AND SUMMARY

A vehicle may be equipped with an evaporative emissions system for reducing an amount of fuel vapor that may escape from a vehicle. The evaporative emissions system may capture fuel vapors while the vehicle is parked and not operating, while the vehicle is being refueled, and while the vehicle is being operated. The vehicle may trap fuel vapors in a fuel vapor storage canister for subsequent introduction to an engine after the engine is started. The fuel vapor may flow from the fuel vapor storage canister to the engine via a canister purge valve. The canister purge valve may be protected from contaminants in the fuel vapor storage system via a filter. However, over time, the filter may fill with contaminants and it may reduce a flow rate from the canister to the engine. If the filter becomes too clogged with contaminants, the evaporative emissions system may not operate as intended.

The inventor herein has recognized the above-mentioned issues and has developed a method for operating an evaporative emissions system, comprising: pressurizing a gas in the evaporative emissions system and applying the pressurized air to a canister purge valve filter; and discharging contaminants once held in the canister purge valve filter to outside of the evaporative emissions system via a check valve.

By applying pressurized air to a canister purge valve filter and ejecting contaminants from the canister purge valve filter and evaporative emissions system, it may be possible to provide the technical result of regenerating a canister purge valve filter so that a vehicle need not be serviced. For example, a compressor that supplies pressurized air to an engine may have a portion of its output directed to an evaporative emissions system. The output from the compressor may cause air to pass through the canister purge valve filter in a reverse direction, thereby dislodging contaminants from the canister purge valve filter. The contaminants may then be ejected from the evaporative emissions system via a check valve.

The present description may provide several advantages. In particular, the methods may regenerate a contaminated fuel vapor storage canister filter so that a vehicle may not need to be serviced. Further, the methods may be implemented via a turbocharger or a pump that is already being used within the vehicle so that system cost may be kept low. Further still, the methods include a way of distinguishing whether or not a canister purge valve filter is filled with contaminants so that the purging process may be applied when it is useful.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
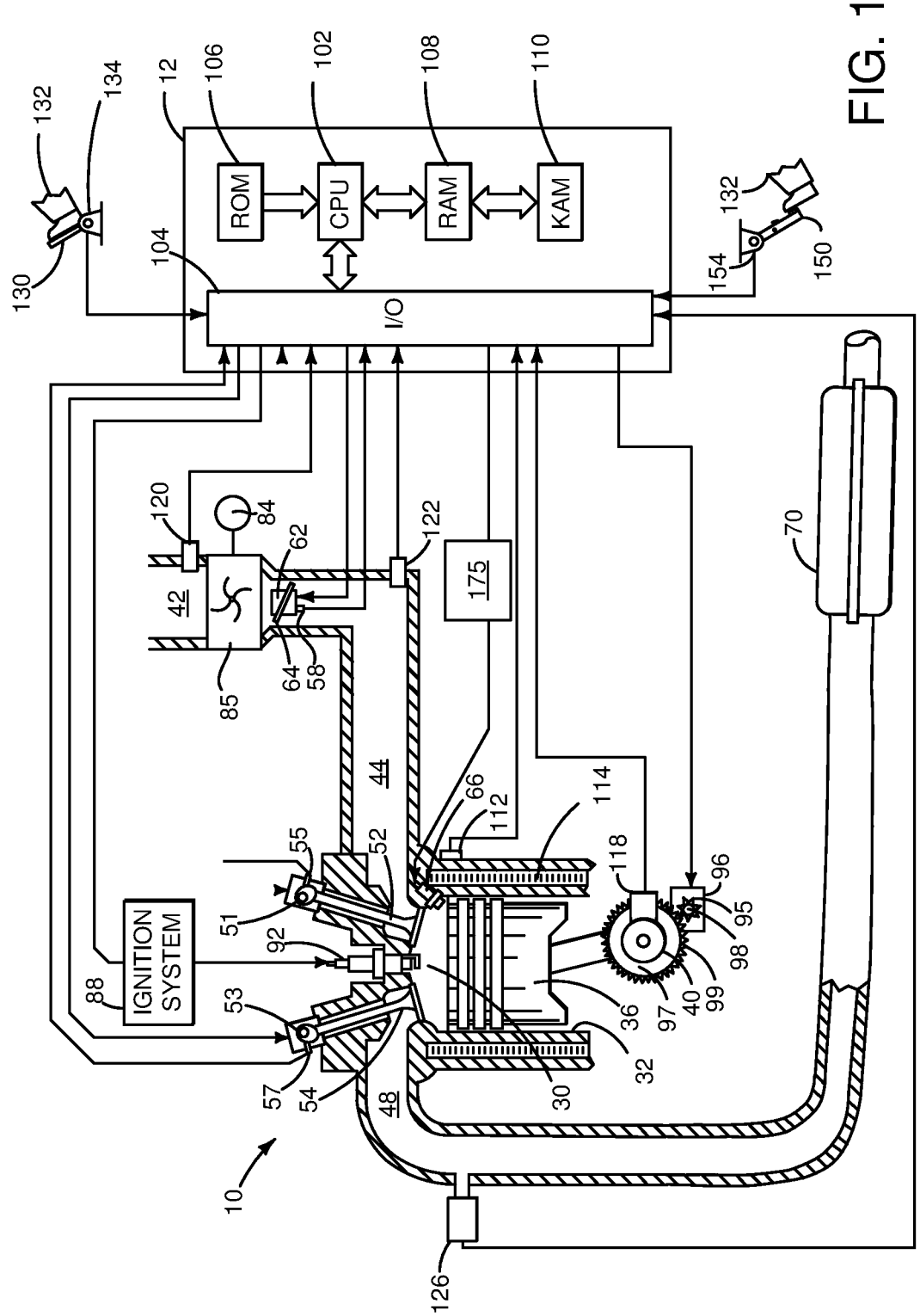
FIG. 1 is a schematic diagram of an engine.
Figure 2:
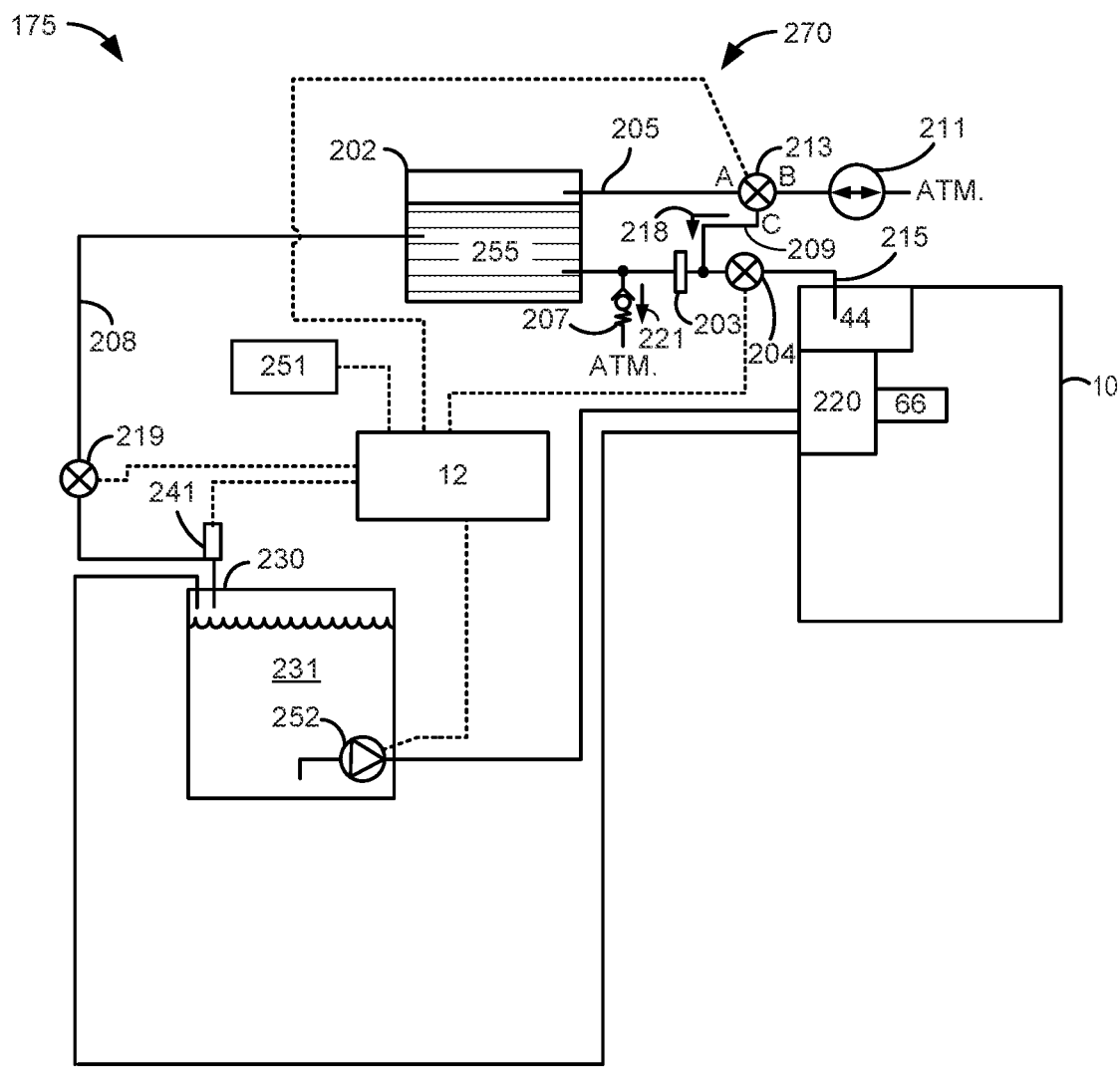
FIG. 2 is a schematic diagram of a first example evaporative emissions system.
Figure 3A:
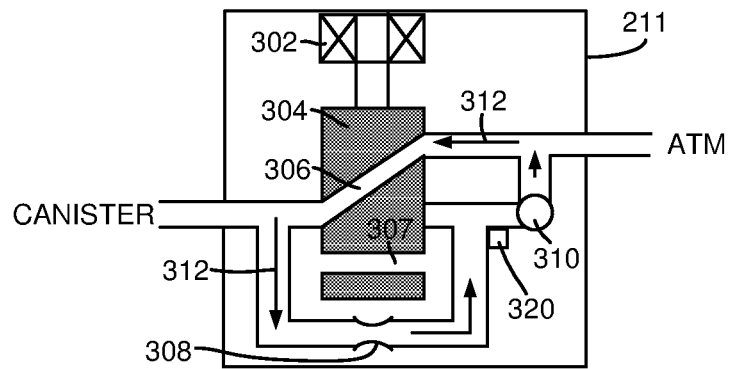
FIGS. 3A-3D show example valve configurations and a sequence for determining whether or not an evaporative emissions system is breached.
Figure 3B:
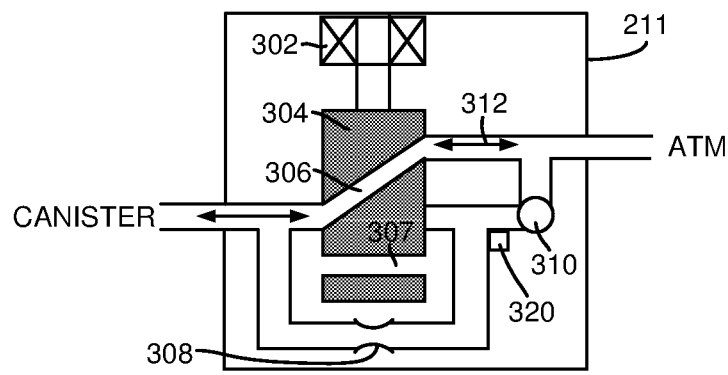
Figure 3C:
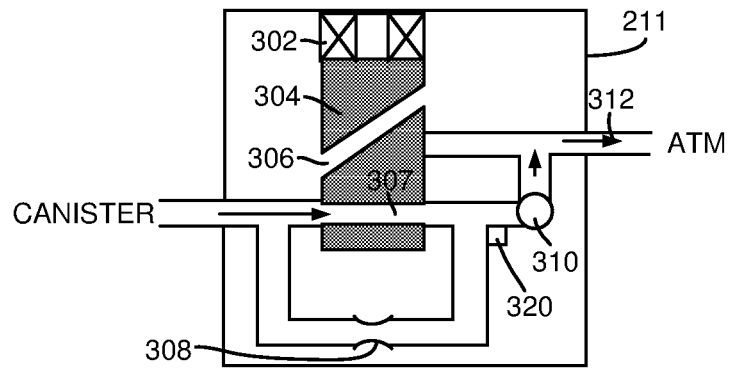
Figure 4:
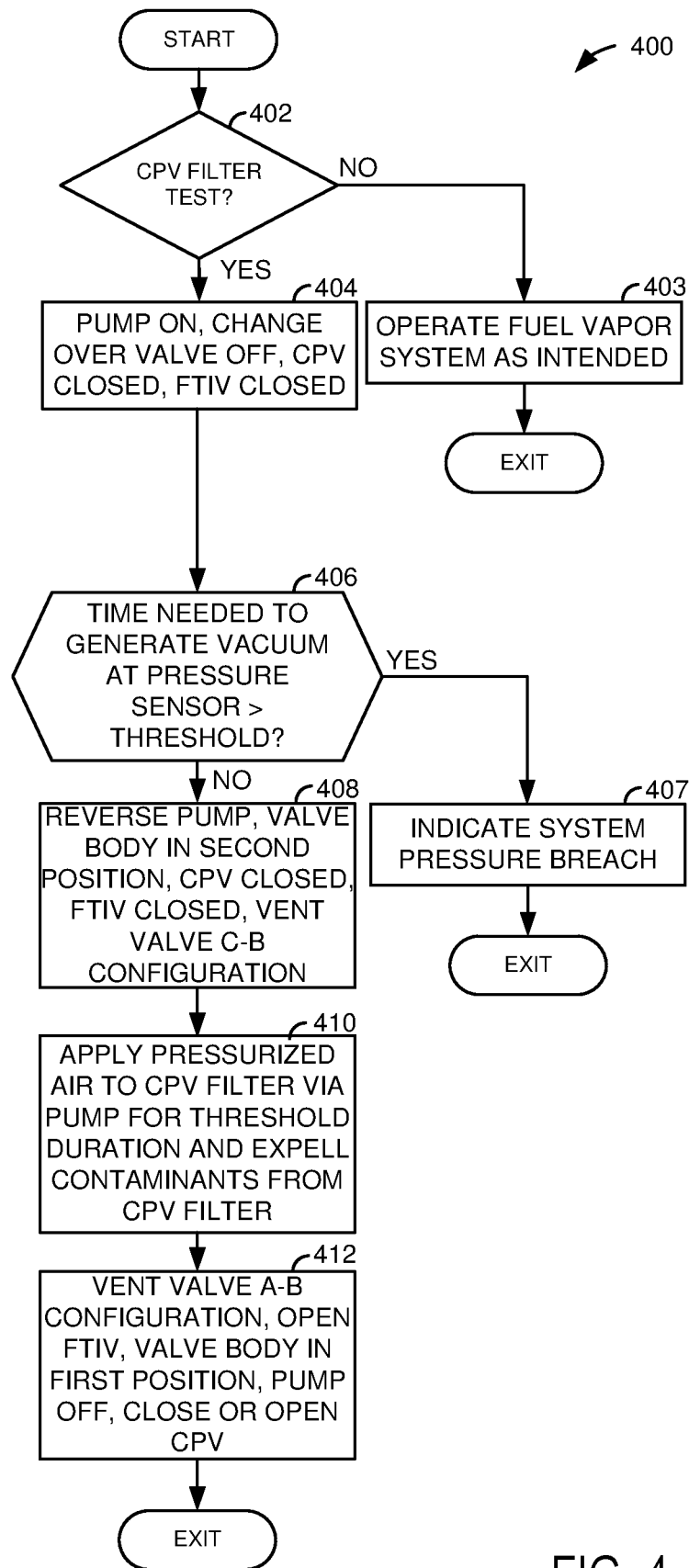
FIG. 4 shows a first method for purging contaminants from canister purge valve filter.
Figure 5:
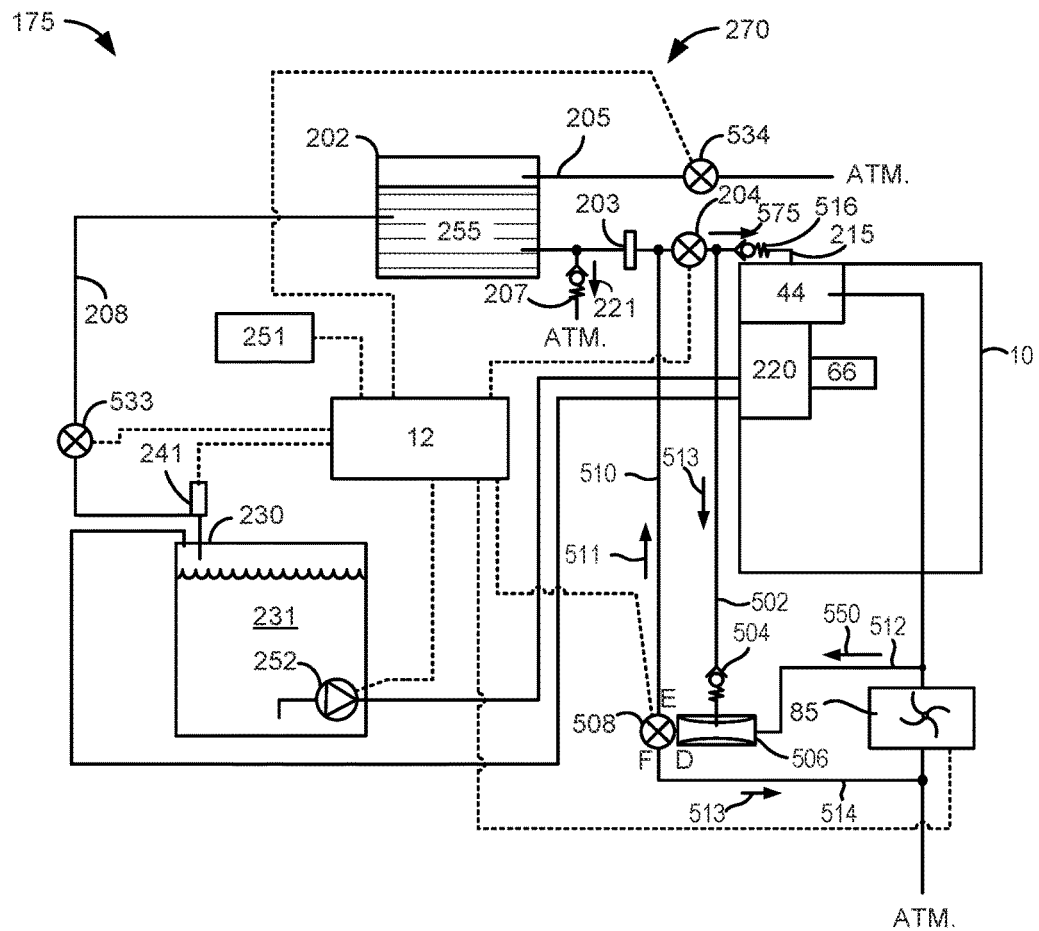
FIG. 5 is a schematic diagram of a second example evaporative emissions system.

The present description is related to diagnosing and purging a canister purge valve filter of an evaporative emissions system of a vehicle. The canister purge valve filter may reduce degradation of a canister purge valve by keeping contaminants from flowing from a fuel vapor storage canister to the canister purge valve. The canister purge valve may selectively allow fuel vapors to flow to an engine as is shown in FIG. 1. The engine may be supplied fuel from a fuel system including an evaporative emissions system as is shown in FIGS. 2 and 5. The canister purge valve filter may be evaluated for clogging by contaminants according to the sequences of FIGS. 3D and 6. An example pumping module that includes a control valve and pump is shown in FIGS. 3A-3C. Methods for purging contaminants from a canister purge valve filter are shown in FIGS. 4 and 7.

Referring to FIG. 1, internal combustion engine 10, comprising a plurality of cylinders, one cylinder of which is shown in FIG. 1, is controlled by electronic engine controller 12.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIG. 2. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Compressor 85 is driven via drive source 84. Drive source 84 may be an electric motor, exhaust driven turbine, or crankshaft. Thus, compressor 85 may be part of a turbocharger, supercharger, or electrically driven turbocharger. Compressor 85 may supply compressed air to engine 10 to increase engine power output.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to propulsion force pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIGS. 1, 2, and 5 provides for an evaporative emissions system, comprising: an engine including a compressor that pressurizes air entering the engine; a fuel vapor storage system configured to deliver fuel vapors to the engine, the fuel vapor storage system including a canister purge valve and a canister purge valve filter; and a controller including executable instruction stored in non-transitory memory that cause the controller to judge whether or not to purge the canister purge valve filter of contaminants and adjust one or more actuators to purge the canister purge valve filter when it is judged to purge the canister purge valve filter. The evaporative emissions system includes where adjusting the one or more actuators includes adjusting output of the compressor. The evaporative emissions system includes where adjusting the one or more actuators includes adjusting a position of a valve. The evaporative emissions system further comprises a pump included in the fuel vapor storage system. The evaporative emissions system further comprises additional instructions to activate the pump in response to judging to purge the canister purge valve filter. The evaporative emissions system includes where purging the canister purge valve filter includes ejecting contaminants from the fuel vapor storage system. The evaporative emissions system further comprises a check valve and where ejecting contaminants from the fuel vapor storage system includes ejecting contaminants via the check valve. The evaporative emissions system includes where the canister purge valve filter is positioned in a conduit between a fuel vapor storage canister and the canister purge valve.

Referring now to FIG. 2, an example fuel system 175 is shown in detail. The fuel system of FIG. 2 may supply fuel to engine 10 shown in detail in FIG. 1. Fuel system 175 includes evaporative emission system 270. The system of FIG. 2 may be operated according to the method of FIG. 4. Fuel system components and fluidic conduits are shown as solid lines and electrical connections are shown as dashed lines. The conduits represented by solid lines provide fluidic communication between devices linked by the conduits. Further, the conduits are coupled to the devices from which and to which they lead.

Evaporative emissions system 270 includes a fuel vapor storage canister 202 for storing fuel vapors. Evaporative emissions system 270 also includes carbon 255 for storing and releasing fuel vapors. Fuel vapor storage canister 202 is shown including atmospheric vent conduit 205 along which three-way canister vent valve (CVV) 213 is placed to selectively allow air to flow into and out of fuel vapor storage canister 202 (e.g., A to B) in a first position. Three-way CVV 213 also selectively allows air to flow from atmosphere to canister purge valve filter 203 (e.g., B to C) in a second position. The ports of three-way CVV 213 are indicated as A, B, and C. Conduit 209 couples three-way valve 213 to conduit 215. Fuel vapors may be supplied to fuel vapor storage canister 202 via conduit 208 and normally open fuel tank isolation valve (FTIV) 219. Fuel vapors may be purged via canister purge valve (CPV) 204 which allows fluidic communication between fuel vapor storage canister 202 and engine intake manifold 44 or intake 42 via conduit 215. Canister purge valve filter 203 reduces flow of contaminants from fuel vapor storage canister 202 to canister purge valve 204, thereby reducing a possibility of canister purge valve 204 being stuck open. The canister purge valve filter 203 may be comprised of cellulose material, foam, plastic, or other known filtering media. Pumping control module 211 includes a bi-directional pump and control valve as shown in FIGS. 3A-3C. Pumping control module 211 may supply pressurized air to canister purge valve filter 203 when CVV is in a second position (e.g., B-C flow), canister purge valve 204 is closed, and FTIV 219 is closed. The pressurized air may open check valve 207 to allow contaminants to be purged from the evaporative emissions system 270 via air that flows in the direction of arrow 221. Pressurized air from pumping control module 211 flows in the direction indicated by arrow 218 when canister purge valve filter 203 is being regenerated.

Engine 10 includes a fuel rail 220 that supplies fuel to direct fuel injector 66. Fuel vapors may be inducted into intake manifold 44 or intake 42 when intake manifold pressure is below atmospheric pressure. Fuel 231 is supplied from fuel tank 230 by fuel pump 252 to fuel rail 220. Pressure in fuel tank 232 may be measured via fuel tank pressure transducer (FTPT) 241 and relayed to controller 12. Controller 12 may receive inputs from the sensors described in FIG. 1 as well as sensor 241. Controller 12 also activates and deactivates CPV 204, three-way CVV 213, FTIV 219, and pump 252 in response to fuel system and engine operating conditions.

In one example, the system of FIG. 2 operates according to the method of FIG. 4 via executable instructions stored in non-transitory memory of controller 12. While engine 10 is operating, fuel vapors from fuel tank 230 may be stored in fuel vapor storage canister 202 in response to temperatures in fuel tank 230 increasing.

Fuel vapors from fuel tank 230 may push air out of CVV 213 when CVV 213 is in a first position and when temperature and/or pressure in fuel tank 230 is increasing. If engine 10 is operating while vapors are being directed to fuel vapor storage canister 202, CPV 204 may be opened so that fuel vapors are drawn into and combusted in engine 10. If engine 10 is not operating or if CPV 204 is closed, fuel vapor may flow into fuel vapor storage canister 202 if temperature and/or pressure in fuel tank 230 increases such that fuel vapors flow to and are stored in fuel vapor storage canister 202.

On the other hand, if engine 10 is not operating or if CPV 204 is closed while temperature and/or pressure in fuel tank 230 is decreasing, fuel vapors from fuel vapor canister 202 may condense in fuel tanks 230 when FTIV 219 is open. FTIV 219 may be a normally open valve that is closed when CPV 204 is open to improve vacuum formation in canister 202, thereby improving evacuation of fuel vapors from fuel vapor storage canister 202. Thus, the fuel system shown in FIG. 2 provides a way of decreasing a volume of the fuel vapor emissions system that is purged so that fuel vapor canister purging may be improved.

Controller 12 may indicate a condition of degradation of the CPV, FTIV, and/or CVV on a display panel 251. Alternatively, 251 may be a light or other device to indicate degradation within the system.

Referring now to FIGS. 3A-3C, detailed views of pumping control module 211 are shown. In particular, pumping control module 211 is shown in a reference check state in FIG. 3A. The pumping control module 211 is shown in a state for evaluating breaches of an evaporative emission state in FIG. 3B. Finally, pumping control module 211 is shown in a purging state for the evaporative emissions system in FIG. 3C. Components shown in FIGS. 3A-3C are the same when they are identified with same numbers. Therefore, for the sake of brevity, the description of the pumping control module 211 and its components is not recited for each figure.

Pumping control module 211 includes a solenoid 302 that may selectively move valve body 304 to one of two positions. Valve body 304 is shown in a first position in FIG. 3A. Valve body 304 includes a first passage 306 and a second passage 307. Pumping control module 211 also includes a bi-directional pump that may move air in a first direction or in a second direction. Pumping control module 211 also includes a pressure sensor 320 for sensing pressure in pumping control module 211 and an orifice 308 to limit flow though pumping control module 211.

Pumping control module 211 may be commanded to a reference check state as shown in FIG. 3A to determine a threshold pressure in pumping control module 211. Valve body 304 is adjusted to a first position as shown and pump 310 is operated to flow air as indicated by arrows 312 in FIG. 3A when pumping control module 211 is commanded to the reference check state. Pressure sensor 330 determines a pressure in pumping control module 211 when pumping control module 211 is in the reference check state.

Pumping control module 211 is shown in a purging state in FIG. 3B. The purging state allows air to flow in either direction through pumping control module 211 as indicated by arrows 312 in FIG. 3B. Valve body 304 is in the first position and pump 310 is off when pumping control module 211 is commanded to the reference purging state.

Pumping control module 211 may also be commanded to a breach detection state as shown in FIG. 3C. The breach detecting state allows a determination of whether or not air or another gas is unintentionally entering and breaching the evaporative emissions system. In particular, valve body 304 is commanded to a second position to allow air to flow through second passage 307. In addition, the pump 310 is activated and it directs air flow to atmosphere as indicated by arrows 312. Pressure sensor 320 detects pressure on an inlet side of pump 310. Air on the inlet side of pump 310 may be at a negative pressure or vacuum relative to atmospheric pressure when the breach detection state is activated.

Figure 3D:
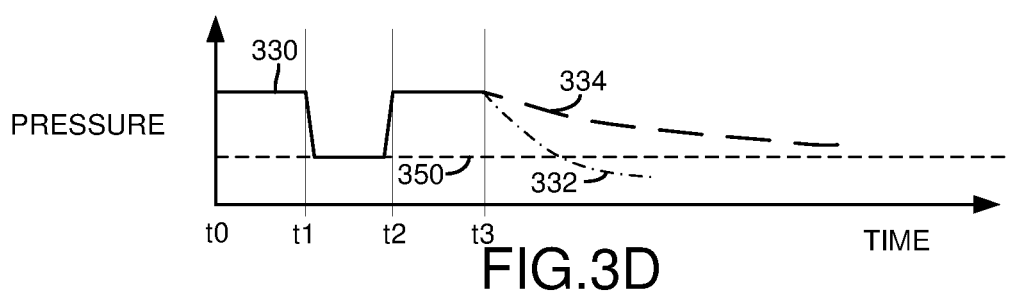

Referring now to FIG. 3D, a sequence for determining whether or not the evaporative emissions system is breached is shown. The sequence of FIG. 3D may be performed via the system of FIG. 2 in cooperation with the method of FIG. 4.

FIG. 3D shows a plot that includes a vertical axis and a horizontal axis. The vertical axis represents pressure and pressure increases in the direction of the vertical axis arrow. The horizontal axis represents time and time increases from the left side of the figure to the right side of the figure.

At time t0, the pumping control module 211 shown in FIGS. 3A-3C is in a purging mode where air may flow through the pumping control module and where the pump 310 is not activated. The pressure is at a higher level.

At time t1, the pumping control module 211 is commanded into the reference check state. The valve body 304 does not move, but the pump 310 is activated and the canister purge valve 204 and FTIV 219 (not shown) are closed. Pressure in the pump control module 211 is reduced to a level that establishes breach threshold 350.

At time t2, the pump 310 is deactivated and pressure in the pumping control module 211 increases in response to deactivating pump 310. With the breach detection threshold 350 established, pumping control module 211 is commanded into the breach detection state at time t3.

At time t3, the valve body 304 is moved to a second position and the pump 310 is activated. The pump 310 begins to evacuate air from the canister 202 shown in FIG. 2 to determine if a breach is present. In other words, the pump 310 is activated to determine if air or another gas is entering or breaching the evaporative emissions control system. If a breach is not present, pressure in the pumping control module 211 may follow a trajectory as shown at 332. Otherwise, if there is a breach, pressure in the pumping control module 211 may follow a trajectory that is similar to trajectory 334. Trajectory 334 may not reach threshold 350, thereby indicating a breach of the evaporative emissions system.

Thus, the pumping control module and its pump may be useful to determine whether or not an evaporative emissions system may be breached. If so, it may not be feasible or prudent to purge contaminants from the canister purge valve filter.

Referring now to FIG. 4, a method for determining whether or not to regenerate a canister purge valve filter and regenerating the canister purge valve filter is shown. The method may be included in the system of FIGS. 1-3C as executable instructions stored in non-transitory memory of controller 12. The method of FIG. 5 may cause controller 12 to transform operating states of devices and actuators in the physical world.

At 402, method 400 judges whether or not to perform a canister purge valve filter test or evaluation. Method 400 may judge to perform a canister purge valve filter evaluation at predetermined times (e.g., after each engine stop or start). If method 400 judges to perform the canister purge valve filter evaluation, the answer is yes and method 400 proceeds to 404. Otherwise, the answer is no and method 400 proceeds to 403.

At 403, method 400 operates the fuel vapor storage system as intended. For example, method 400 may allow fuel vapors from a fuel tank to accumulate in a fuel vapor storage canister. Method 400 may also purge the fuel vapors from the fuel vapor storage canister to the engine when it is determined that the fuel vapor storage canister is filled with fuel vapors. Method 400 proceeds to exit.

At 404, method 400 activates the pump 310 in the pump control module 211. Method 400 also positions the valve body 304 in a first position as shown in FIG. 3A. Method 400 fully closes the canister purge valve and the FTIV valve. These actions are taken to seal the evaporative emissions system to determine if there is a breach in the evaporative emissions system. Method 400 proceeds to 406.

At 406, method 400 judges if the amount of time used to generate a predetermined amount of vacuum at the location of the pressure sensor (e.g., in the pumping control module 211) is greater than a threshold amount of time. Alternatively, method 400 may judge if vacuum generated at the pressure sensor has reached a threshold vacuum level in greater than a threshold amount of time. If so, the answer is yes and method 400 proceeds to 407. Otherwise, the answer is no and method 400 proceeds to 408. If method 400 judges that the amount of time to generate the predetermined vacuum level is greater than the threshold amount of time, there may be a breach in the evaporative emissions system so it may not be possible to reliably regenerate the canister purge valve filter.

At 407, method 400 indicates that the evaporative emissions system is breached. The indication may be provided to vehicle occupants via a human/machine interface. Method 400 proceeds to exit.

At 408, method 400 reverses the pump causing air to flow into the evaporative emissions system from atmosphere. Method 400 also moves the valve body to a second position that allows air to flow from atmosphere to the canister purge valve filter. Method 400 also fully closes the canister purge valve and the FTIV. The canister vent valve (e.g., 213 of FIG. 2) is positioned so that air flow may flow from C to B. Method 400 proceeds to 410.

At 410, method 400 applies pressurized air to the canister purge valve filter via air flow in the direction of arrow 218 of FIG. 2. The pressurized air may flow at a constant rate, or alternatively, the pressurized air may be pulsed to remove contaminants from the canister purge valve filter. The pressurized air may be provided to the filter for a predetermined amount of time. The contaminants may include carbon particles from the fuel vapor storage canister. Method 400 proceeds to 412.

At 412, method 400 repositions the canister vent valve (CVV) (e.g., 213 of FIG. 2) to the A-B position so that air may flow from atmosphere to the canister or vice-versa. Method 400 also opens the FTIV and opens or closes the canister purge valve. Method 400 also deactivates the pump in the pumping control module 211. The valve body is adjusted to the first position. Method 400 proceeds to exit.

In this way, a diagnostic test or procedure may be used to determine if an evaporative emissions system breach is present. If not, a canister purge valve filter may be regenerated via applying pressurized air to the canister purge valve filter such that air flow through the canister purge valve filter is reversed as compared to when fuel vapors flow from the fuel vapor storage canister to the engine via the canister purge valve and canister purge valve filter.

Referring now to FIG. 5, an example fuel system 175 is shown in detail. The fuel system of FIG. 5 includes many of the same components as the fuel system of FIG. 2. Therefore, for the sake of brevity, a description of components shown in FIG. 5 that are the same and numbered the same as those shown in FIG. 2 is not repeated. Components that are unique to the fuel system shown in FIG. 5 are described. The system of FIG. 5 may be operated according to the method of FIG. 7. Fuel system components and fluidic conduits are shown as solid lines and electrical connections are shown as dashed lines. The conduits represented by solid lines provide fluidic communication between devices linked by the conduits. Further, the conduits are coupled to the devices from which and to which they lead.

Evaporative emissions system 270 includes a venturi or ejector 506 for generating vacuum in evaporative emissions system 270 when engine 10 is in a boosted operating state (e.g., supplied with air pressure above atmospheric pressure). The ejector 506 is supplied with pressurized air from compressor 85 in a direction of flow indicated by arrows 550 via conduit 512. When engine 10 is operating with a vacuum in intake manifold 44, fuel vapors may flow from canister 202 to intake manifold in the direction of arrow 575. When engine 10 is operating under boost pressure, fuel vapors may flow from canister 202 to intake manifold 44 in the direction of arrows 513. Check valve 516 prevents air flow into canister 202 from intake manifold 44. Check valve 504 prevents air flow from ejector 506 to intake manifold 44 and canister 202 via conduit 502. Three-way valve 508 controls air flow output from ejector 506 and it may be referred to as a canister purge valve filter purge valve. Ports of three-way valve 508 are indicated as D, E, and F. Three-way valve 508 is positioned to allow air flow from port D to port E when canister purge valve filter 203 is being regenerated. Three-way valve 508 is positioned to allow air flow from port D to port F when canister purge valve filter 203 is not being regenerated. By positioning three-way valve 508 to allow air flow to canister purge valve filter 203 in the direction of arrow 511 via conduit 510, compressor 85 may deliver pressurized air to canister purge valve filter 203 so that contaminants and excess air may flow past check valve 207 in the direction of arrow 221.

Fuel vapor storage canister 202 is shown including atmospheric vent conduit 205 along which two-way canister vent valve (CVV) 534 is placed to selectively allow or inhibit air to flow into and out of fuel vapor storage canister 202 from atmosphere (ATM.). Fuel vapors may be supplied to fuel vapor storage canister 202 via conduit 208 and normally open vapor blocking valve (VBV) 533. Fuel vapors may be purged via canister purge valve (CPV) 204 which allows fluidic communication between fuel vapor storage canister 202 and engine intake manifold 44 or intake 42 via conduit 205. Canister purge valve filter 203 reduces flow of contaminants from fuel vapor storage canister 202 to canister purge valve 204, thereby reducing a possibility of canister purge valve 204 being stuck open. In one example, the system of FIG. 5 operates according to the method of FIG. 7 via executable instructions stored in non-transitory memory of controller 12. While engine 10 is operating, fuel vapors from fuel tank 230 may be stored in fuel vapor storage canister 202 in response to temperatures in fuel tank 230 increasing.

In this way, pressurized air from a compressor may be applied to purge a canister purge valve filter of contaminants. The contaminants may be prevented from reentering fuel vapor storage canister 202 via closing VBB 533 and two-way CVV 534. Check valve 207 may open when positive pressure is applied thereto.

Figure 6:
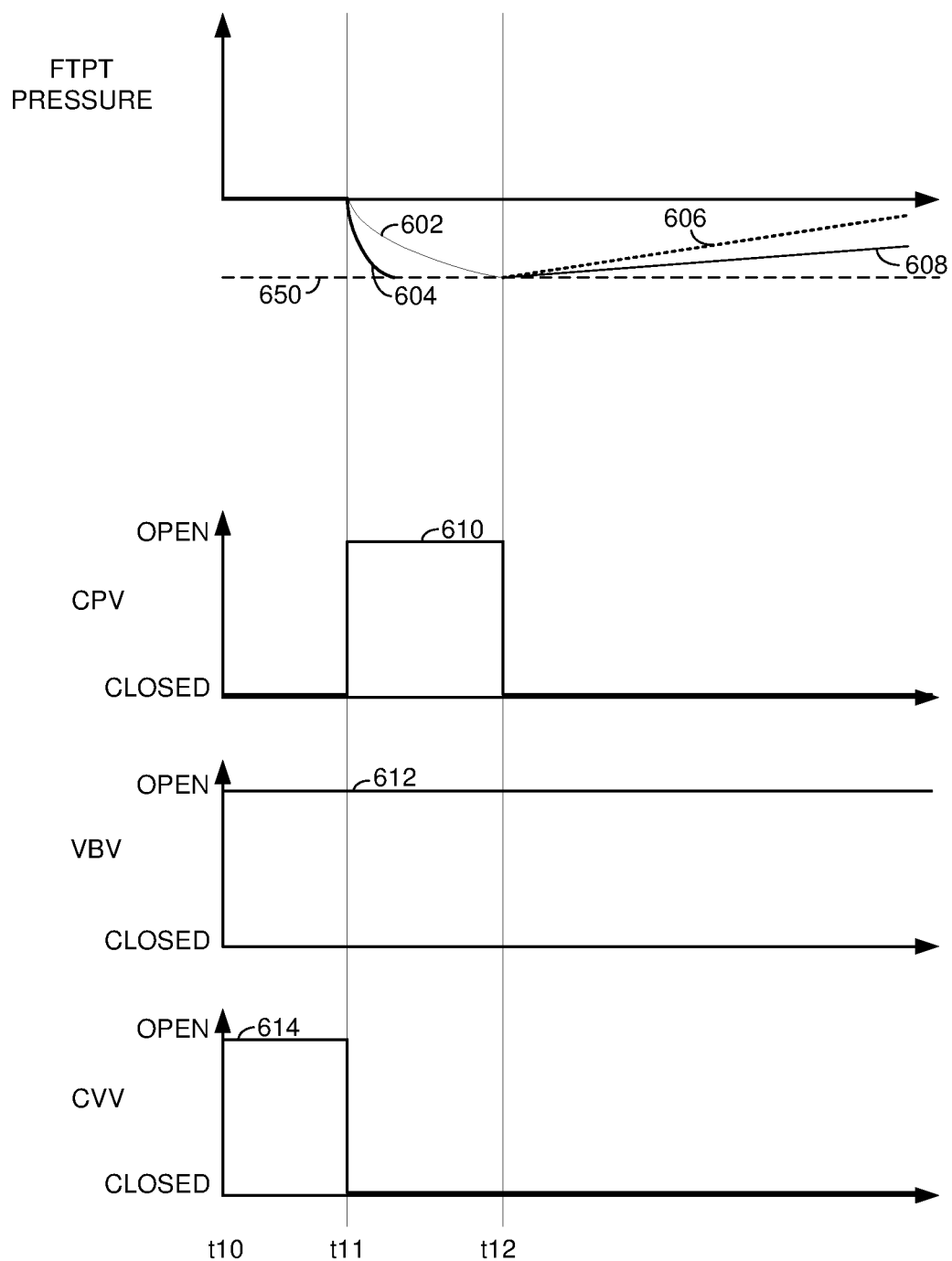
FIG. 6 is an example sequence for determining whether or not a filter is filled with contaminants for a first evaporative emissions system.
Figure 7:
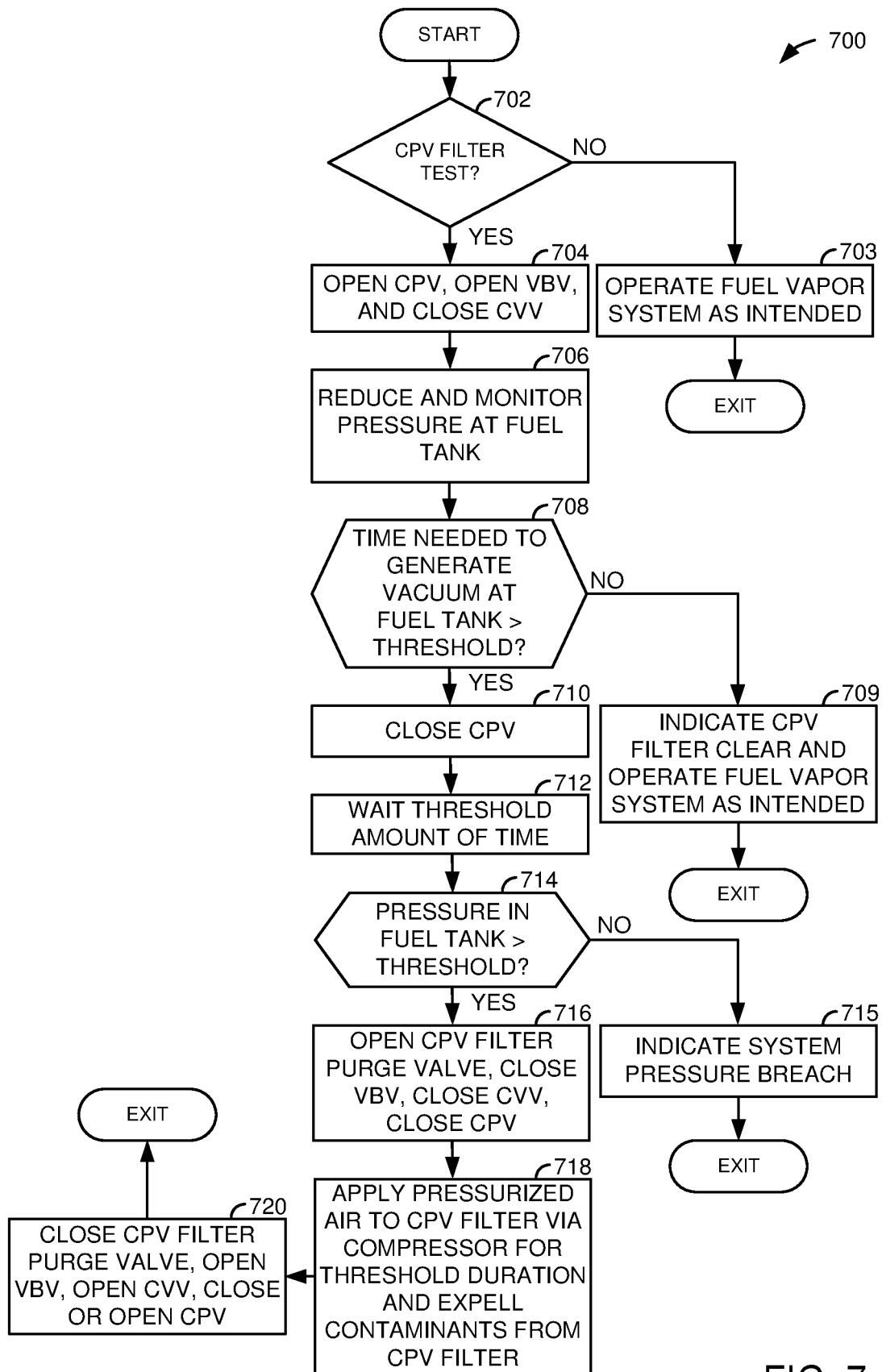
FIG. 7 shows a second method for purging contaminants from canister purge valve filter.

Turning now to FIG. 6, an example breach detection operating sequence for the system of FIGS. 1 and 5 is shown. The sequence of FIG. 6 may be generated via the system of FIG. 5 in cooperation with the method of FIG. 7.

The first plot from the top of FIG. 6 is a plot of pressure at a fuel tank pressure transducer or sensor (FTPT) versus time. The vertical axis represents fuel tank pressure and fuel tank pressure increases in the direction of the vertical axis arrow. The horizontal axis represents time and time increases from the left side of the figure to the right side of the figure. Horizontal line 650 represents a threshold pressure to be reached during an evaporative emissions system breach evaluation.

The second plot from the top of FIG. 6 is a plot of canister purge valve (CPV) operating state versus time. The vertical axis represents CPV position and the CPV is open when trace 610 is at a higher level. The CPV is closed when trace 610 is at a lower level near the horizontal axis. The horizontal axis represents time and time increases from the left side of the figure to the right side of the figure. Trace 610 represents CPV state.

The third plot from the top of FIG. 6 is a plot of vapor blocking valve (VBV) operating state versus time. The vertical axis represents VBV position and the VBV is open when trace 612 is at a higher level. The VBV is closed when trace 612 is at a lower level near the horizontal axis. The horizontal axis represents time and time increases from the left side of the figure to the right side of the figure. Trace 612 represents VBV state.

The fourth plot from the top of FIG. 6 is a plot of canister vent valve (CVV) operating state versus time. The vertical axis represents CVV position and the CVV is open when trace 614 is at a higher level. The CVV is closed when trace 614 is at a lower level near the horizontal axis. The horizontal axis represents time and time increases from the left side of the figure to the right side of the figure.

At time t10, the evaporative emissions system is not being evaluated for a breach condition. The pressure in the fuel tank is zero and the CPV is closed. In addition, the VBV is open and the CVV is open.

At time t11, the evaporative emissions system begins to be evaluated for a breach condition. The CPV is opened so that a vacuum may be drawn in the fuel vapor storage canister and the fuel tank via the engine. The VBV is open so that pressure may be observed at the FTPT and the CVV is closed so that the vacuum may be drawn. Trace 602 represents fuel tank pressure and it may be indicative of when a CPV filter is at least partially clogged with contaminants. Trace 604 represents a fuel tank pressure and it may be indicative or when the CPV filter is not clogged with contaminants. Notice that trace 602 takes a substantially longer time to reach breach pressure evaluation threshold 650.

At time t12, the CPV is closed so that if there is a breach of the evaporative emissions system, the pressure observed by the FTPT will increase toward atmospheric pressure because the breach may allow air to flow into the evaporative emissions system. The VBV remains open so that the pressure may be observed via the FTPT and the CVV remains closed to seal the system. Trace 606 represents pressure in the evaporative emissions system and its rate of increase may be indicative of a breach in the evaporative emissions system. Trace 608 represents pressure in the evaporative emissions system and its rate of increase may be indicative of when a breach is not present in the evaporative emissions system.

Thus, the rate of pressure change and/or the time duration it takes for pressure in the evaporative emissions system to reach a threshold pressure may be indicative of a clogged canister purge filter. Conversely, the rate of pressure change and/or the time duration it takes for pressure in the evaporative emissions system to increase when air is not being drawn from the evaporative emissions system may be indicative of whether or not the evaporative emissions system has been breached Referring now to FIG. 7, a second method for determining whether or not to regenerate a canister purge valve filter and regenerating the canister purge valve filter is shown. The method may be included in the system of FIGS. 1 and 5 as executable instructions stored in non-transitory memory of controller 12. The method of FIG. 7 may cause controller 12 to transform operating states of devices and actuators in the physical world.

At 702, method 700 judges whether or not to perform a canister purge valve filter test or evaluation. Method 700 may judge to perform a canister purge valve filter evaluation at predetermined times (e.g., after each engine stop or start). If method 700 judges to perform the canister purge valve filter evaluation, the answer is yes and method 700 proceeds to 704. Otherwise, the answer is no and method 700 proceeds to 703.

At 703, method 700 operates the fuel vapor storage system as intended. For example, method 700 may allow fuel vapors from a fuel tank to accumulate in a fuel vapor storage canister. Method 700 may also purge the fuel vapors from the fuel vapor storage canister to the engine when it is determined that the fuel vapor storage canister is filled with fuel vapors. Method 700 proceeds to exit.

At 704, method 700 opens the canister purge valve so that the engine may draw a vacuum in the evaporative emissions system, opens the VBV so that pressure in the evaporative emissions system may be reflected at the FTPT, and closes the CVV so that a vacuum may be drawn in the evaporative emissions system. These actions are taken to seal the evaporative emissions system to determine if there is a breach in the evaporative emissions system. Method 700 proceeds to 706.

At 706, method 700 reduces and monitors pressure (e.g., stores pressure values to controller ram) in the evaporative emissions system including pressure in the fuel tank and pressure in the fuel vapor storage canister. The pressure may be reduced via drawing air into the engine via the CPV and the CPV filter. Method 700 proceeds to 708.

At 708, method 700 judges if the amount of time used to generate a predetermined amount of vacuum at the location of the pressure sensor (e.g., FTPT) is greater than a threshold amount of time. Alternatively, method 700 may judge if vacuum generated at the pressure sensor has not reached a threshold vacuum level in less than a threshold amount of time. If either answer is yes, method 700 proceeds to 710. Otherwise, the answer is no and method 700 proceeds to 709. If method 700 judges that the vacuum generated at the pressure sensor has not reached the threshold level in less than a threshold amount of time, there CPV filter may be clogged with contaminants.

At 709, method 700 indicates that the CPV filter is clear and the evaporative emissions system is operated as intended. Method 700 proceeds to exit.

At 710, closes the CPV. The CPV is closed so that additional air is not drawn from the evaporative emissions system. However, if there is a breach in the evaporative emissions system, pressure in the evaporative emissions system may rise. Method 700 proceeds to 712.

At 712, method 700 waits a threshold amount of time (e.g., two minutes) for pressure in the evaporative emissions system to increase. Method 700 proceeds to 714.

At 714, method 700 judges if pressure in the evaporative emissions system including the fuel tank is greater than a threshold pressure. If not, the answer is no and method 700 proceeds to 715. If so, the answer is yes and method 700 proceeds to 716.

At 715, method 700 indicates a breach of the evaporative emissions system. The vehicle occupants may be directed to have the vehicle serviced. Method 700 proceeds to exit.

At 716, method 700 opens the canister purge valve filter purge valve (e.g., allows air flow from port D to port E) to allow air flow from the compressor into the evaporative emissions system and to the canister purge filter. Method 700 also closes the VBV so that air does not flow from the evaporative emissions system. Method 700 also closes the CPV and the CVV. Air flow from the compressor is applied in a direction that is opposite to the direction that air flows from the canister purge valve filter to the engine. This may allow contaminants to be dislodged from the canister purge valve filter. Method 700 proceeds to 718.

At 718, method 700 applies air pressure to the canister purge valve filter for a threshold amount of time (e.g., 30 seconds). In some examples, the air that flows to the canister purge valve filter may flow continuously at a fixed rate. In other examples, the air that flows to the canister purge valve filter may flow in a pulsed fashion such that air flows for an amount of time and then stops, and then starts to flow again. Method 700 proceeds to 720.

At 720, method 700 closes the CPV filter purge valve (e.g., ceases air flow from port D to port E and allows air flow from port D to port F), opens the VBV, opens the CVV, and closes or opens the CPV depending on vehicle operating conditions. Method 700 proceeds to exit.

In this way, a diagnostic test or procedure may be used to determine if an evaporative emissions system breach is present. If not, a canister purge valve filter may be regenerated via applying pressurized air to the filter such that air flow through the filter is reversed as compared to when fuel vapors flow from the fuel vapor storage canister to the engine via the canister purge valve and canister purge valve filter. The air flow may be provided via a compressor that supplies air to an intake of an engine.

Thus, the methods of FIGS. 4 and 7 provide for a method for operating an evaporative emissions system, comprising: pressurizing a gas (e.g., air) in the evaporative emissions system and applying the pressurized gas to a canister purge valve filter; and discharging contaminants once held in the canister purge valve filter to outside of the evaporative emissions system via a check valve. The method further comprises opening the check valve via the gas that is pressurized. The method includes where the gas is pressurized via a compressor that supplies air to an engine. The method includes where the gas is pressurized via a pump included in the evaporative emissions system. The method includes where the contaminants include carbon. The method includes where the canister purge valve filter is positioned along a conduit between a fuel vapor storage canister and a canister purge valve. The method includes where the check valve is positioned along the conduit between the filter and the fuel vapor storage canister.

Thus, the methods of FIGS. 4 and 7 also provide for a method for operating an evaporative emissions system, comprising: purging contaminants from a canister purge valve filter in response to absence of a breach of the evaporative emissions system and an amount of time for generating a vacuum in the evaporative emissions system exceeding a threshold. The method includes where the contaminants are purged via a check valve and a pump or compressor. The method includes where the pump is a pump positioned along a conduit between atmosphere and a fuel vapor storage canister. The method includes where the compressor is an electrically driven compressor. The method includes where purging contaminants from the canister purge filter includes flowing air through the canister purge valve filter in a direction that is opposite of a direction that air flows through the canister purge valve filter when fuel vapors are purged from a fuel vapor storage canister to an engine.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an evaporative emissions system, comprising:
   pressurizing a gas in the evaporative emissions system and applying the pressurized gas to a canister purge valve filter, where the canister purge valve filter is positioned along a conduit between a fuel vapor storage canister and a canister purge valve, and where a check valve is positioned along the conduit between the filter and the fuel vapor storage canister; and
   discharging contaminants once held in the canister purge valve filter to outside of the evaporative emissions system via the check valve.

2. The method of claim 1, further comprising opening the check valve via the gas that is pressurized.

3. The method of claim 1, where the gas is pressurized via a compressor that supplies air to an engine.

4. The method of claim 1, where the gas is pressurized via a pump included in the evaporative emissions system.

5. The method of claim 1, where the contaminants include carbon.

6. The method of claim 1, further comprising activating a pump located along an atmospheric vent conduit to pressurize the gas.

7. The method of claim 6, further comprising opening a valve to deliver the pressurized gas at a location along a conduit extending between the canister purge valve filter and the canister purge valve, the location being between canister purge valve filter and the canister purge valve.

8. An evaporative emissions system, comprising:
   an engine including a compressor that pressurizes air entering the engine;
   a fuel vapor storage system configured to deliver fuel vapors to the engine, the fuel vapor storage system including a canister purge valve and a canister purge valve filter;
   a valve configured to direct air from the compressor to the fuel vapor storage system conduit at a location between the canister purge valve and the canister purge valve filter; and
   a controller including executable instruction stored in non-transitory memory that cause the controller to purge the canister purge valve filter of contaminants via opening the valve.

9. The evaporative emissions system of claim 8, further comprising a canister purge valve, a canister vent valve, and additional executable instructions cause the controller to close the canister purge valve and the canister vent valve when the valve configured to direct air from the compressor to the fuel vapor storage system between the canister purge valve and the canister purge valve filter is open.

10. The evaporative emissions system of claim 9, further comprising additional instructions to provide pulsed air flow to the canister purge valve filter.

11. The evaporative emissions system of claim 8, further comprising additional executable instructions that cause the controller to open the canister purge valve in response to a request to test operation of the canister purge valve filter.

12. The evaporative emissions system of claim 11, further comprising additional instructions to purge the canister vent valve filter in response to an indication that the canister purge valve filter is clogged with contaminants.

13. The evaporative emissions system of claim 12, where purging the canister purge valve filter includes ejecting contaminants from the fuel vapor storage system.

14. The evaporative emissions system of claim 13, further comprising a check valve and where ejecting contaminants from the fuel vapor storage system includes ejecting contaminants via the check valve.

15. The evaporative emissions system of claim 8, where the canister purge valve filter is positioned in a conduit between a fuel vapor storage canister and the canister purge valve.

16. A method for operating an evaporative emissions system, comprising:
   purging contaminants from a canister purge valve filter in response to absence of a breach of the evaporative emissions system and an amount of time for generating a vacuum in the evaporative emissions system exceeding a threshold.

17. The method of claim 16, where the contaminants are purged via a check valve and a pump or compressor.

18. The method of claim 17, where the pump is a pump positioned along a conduit between atmosphere and a fuel vapor storage canister.

19. The method of claim 17, where the compressor is an electrically driven compressor.

20. The method of claim 16, where purging contaminants from the canister purge filter includes flowing air through the canister purge valve filter in a direction that is opposite of a direction that air flows through the canister purge valve filter when fuel vapors are purged from a fuel vapor storage canister to an engine.

* * * * *